United States Patent
Denicia Aguilar et al.

(10) Patent No.: US 12,427,818 B2
(45) Date of Patent: Sep. 30, 2025

(54) VEHICLE TRAILER ELECTRICAL CONNECTOR HAVING TRAILER DETECTION

(71) Applicant: Ford Global Technologies, LLC, Dearborn, MI (US)

(72) Inventors: Enrique Denicia Aguilar, Miguel Hidalgo (MX); Jose Uriel Hernandez, Tultitlan (MX); J. Elias Ruiz, Atizapan (MX); Cesar Sanchez Razo, Tlalnepantla de Baz (MX)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 18/106,019

(22) Filed: Feb. 6, 2023

(65) Prior Publication Data

US 2024/0262144 A1    Aug. 8, 2024

(51) Int. Cl.
*B60D 1/64* (2006.01)
*H01R 13/70* (2006.01)
*H01R 13/703* (2006.01)

(52) U.S. Cl.
CPC ........... *B60D 1/64* (2013.01); *H01R 13/7031* (2013.01); *H01R 13/70* (2013.01); *H01R 13/703* (2013.01)

(58) Field of Classification Search
CPC .... H01R 9/2425; H01R 9/2433; H01R 13/70; H01R 13/701; H01R 13/703; H01R 13/7036; H01R 13/7037; H01R 13/71; H01R 13/713; H01R 2201/26; H01R 13/7031; H01R 13/7032; B60D 1/64;
(Continued)

(56) References Cited

U.S. PATENT DOCUMENTS 3,781,501 A * 12/1973 Borghetti ........... H01H 11/0012
                                                          200/279
4,006,453 A *  2/1977 Bryant ..................... B60Q 1/38
                                                          340/475
5,184,960 A    2/1993 Hopkins et al.
(Continued)

FOREIGN PATENT DOCUMENTS

DE         10063802 A1    7/2002
DE    102009008433 A1    8/2010
(Continued)

*Primary Examiner* — Renee S Luebke
*Assistant Examiner* — Paul D Baillargeon
(74) *Attorney, Agent, or Firm* — Frank Lollo; Price Heneveld LLP

(57) ABSTRACT

A trailer electrical connector system for a motor vehicle includes a housing configured to be connected to the motor vehicle, a plurality of electrical connectors each configured to connect to a plug-in trailer connector to provide electrical power to a trailer, and a normally closed switch electrically coupled to a pair of the electrical connectors, wherein the normally closed switch is in a closed state when the plug-in trailer connector is not connected to the plurality of electrical connectors and moves to an open state when the plug-in electrical connector is connected to the electrical connectors. The system also includes a controller sensing an electrical signal across the pair of electrical connectors through the normally closed switch and detecting a state of the electrical connection of the trailer to the vehicle based on the detected state.

18 Claims, 6 Drawing Sheets

(58) Field of Classification Search
CPC .. B60D 1/62; B62D 15/025; H01H 2225/012; H01H 2225/014
See application file for complete search history.

(56) References Cited

U.S. PATENT DOCUMENTS

| | | | |
|---|---|---|---|
| 5,233,322 A * | 8/1993 | Posey | H01H 36/002 335/207 |
| 6,642,628 B2 * | 11/2003 | Burdick | B60D 1/62 439/35 |
| 10,103,488 B2 | 10/2018 | Ghannam et al. | |
| 2005/0096124 A1 | 5/2005 | Stronach | |
| 2005/0184689 A1 | 8/2005 | Maslov et al. | |
| 2009/0194968 A1 | 8/2009 | Ardagna | |
| 2017/0200197 A1 | 7/2017 | Brubaker | |
| 2017/0349039 A1 | 12/2017 | Rayner et al. | |
| 2020/0130745 A1 * | 4/2020 | Cooke | B60D 1/64 |
| 2021/0206218 A1 * | 7/2021 | Muddasani | B62D 33/0273 |

FOREIGN PATENT DOCUMENTS

| | | |
|---|---|---|
| EP | 2949490 A1 | 5/2015 |
| EP | 3944970 A1 | 7/2020 |
| EP | 3944971 A1 | 7/2020 |
| EP | 3944972 A1 | 7/2020 |
| EP | 3944973 A1 | 7/2020 |

\* cited by examiner

VEHICLE TRAILER ELECTRICAL CONNECTOR HAVING TRAILER DETECTION

FIELD OF THE DISCLOSURE

The present disclosure generally relates to vehicle trailer connections, and more particularly relates to an electrical trailer connector that detects the connection of a trailer to the vehicle.

BACKGROUND OF THE DISCLOSURE

Trailer towing motor vehicles are commonly configured with a trailer hitch for connecting the trailer to the vehicle and further typically include a plugin electrical connector for electrically connecting the trailer to the vehicle to provide electric power to power electronic equipment, such as trailer lights including turn signals, running lights, trailer brakes, and reverse lights, for example. Motor vehicles are increasingly equipped with trailer assistance systems such as backup trailer assistance, park assist and other vehicle systems that would find it beneficial to detect the presence of a trailer. The electrical connection of a trailer via the electrical connector to the vehicle may serve as a trailer detection. It would be desirable to provide for a trailer detection that provides for an efficient and effective detection of a connected trailer.

SUMMARY OF THE DISCLOSURE

According to a first aspect of the present disclosure, a trailer electrical connector system for a motor vehicle is provided. The system includes a housing configured to be connected to the motor vehicle, and a plurality of electrical connectors each configured to connect to a plug-in trailer connector to provide electrical power to a trailer. The system also includes a normally closed switch electrically coupled to a pair of the electrical connectors, wherein the normally closed switch is in a closed state when the plug-in trailer connector is not connected to the plurality of electrical connectors and moves to an open state when the plug-in electrical connector is connected to the electrical connectors, and a controller sensing an electrical signal across the pair of electrical connectors through the normally closed switch and detecting a state of the electrical connection of the trailer to the vehicle based on the detected state.

Embodiments of the first aspect of the present disclosure can include any one or a combination of the following features:
- the normally closed switch comprises a mechanical switch;
- the normally closed switch comprises a magnetic switch;
- the pair of electrical contacts comprises a first electrical connector for providing a first trailer control signal and a second electrical connector providing a second trailer control signal;
- the first trailer control signal comprises a first trailer light signal and the second trailer control signal comprises a second trailer light signal;
- the first trailer light signal comprises a vehicle trailer running light signal and the second trailer light signal comprises a trailer reverse light signal;
- at least some of the electrical connectors comprises blades;
- the plurality of electrical connectors comprises seven electrical connectors;
- a first transistor in line with a first electrical connector and a second transistor in series with a second electrical connector; and
- the controller further controls a vehicle trailering system based on the detected state.

According to a second aspect of the present disclosure, a vehicle is provided that includes a trailer tow hitch and a trailer electrical connector system. The system includes a housing connected to the vehicle, a plurality of electrical connectors each configured to connect to a plug-in trailer connector to provide electrical power to a trailer, and a normally closed switch electrically coupled to a pair of the electrical connectors, wherein the normally closed switch is in a closed state when the plug-in trailer connector is not connected to the plurality of electrical connectors and moves to an open state when the plug-in trailer connector is connected to the electrical connectors. The system also includes a controller sensing an electrical signal across the pair of electrical connectors through the normally closed switch and detecting a state of the electrical connection of the trailer to the vehicle based on the detected state.

Embodiments of the second aspect of the present disclosure can include any one or a combination of the following features:
- the normally closed switch comprises a mechanical switch;
- the normally closed switch comprises a magnetic switch;
- the pair of electrical contacts comprises a first electrical connector for providing a first trailer control signal and a second electrical connector providing a second trailer control signal;
- the first trailer control signal comprises a first trailer light signal and the second trailer control signal comprises a second trailer light signal;
- the first trailer light signal comprises a vehicle trailer running light signal and the second trailer light signal comprises a trailer reverse light signal;
- the plurality of electrical connectors comprises seven electrical connectors;
- at least some of the electrical connectors comprises blades;
- a first transistor in series with a first electrical connector and a second transistor in series with a second electrical connector; and
- the controller further controls a vehicle trailering system based on the detected state.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
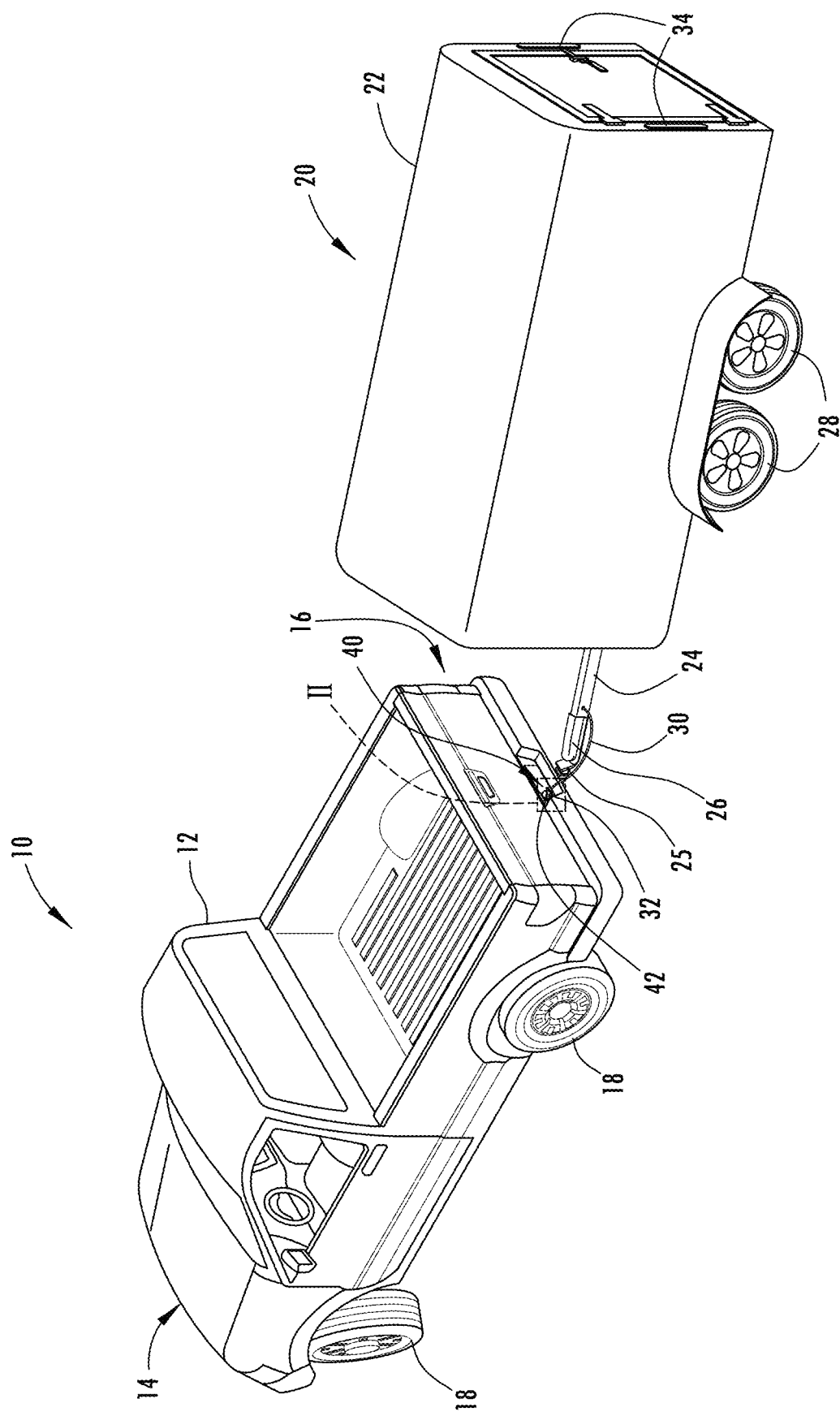
FIG. 1 is a perspective view of a motor vehicle connected to a trailer and equipped with a vehicle trailer electrical connector system, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle trailer electrical connector system having trailer detection. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-6, a motor vehicle 10 is illustrated connected to a trailer 20 and equipped with an electrical connector system 40, according to one embodiment. The motor vehicle 10 includes a trailer tow hitch 25 which is configured to support and tow a trailer. The tow hitch 25 may include a ball or other connector for connecting to a coupler 26 on the trailer 20. The electrical connector system 40 is configured to connect to a trailer plug-in connector to supply electrical power to the trailer 20 and to detect an electrical connection of the trailer plug-in connector to the motor vehicle 10 to confirm that a trailer 20 is connected to the motor vehicle 10.

Referring to FIG. 1, a motor vehicle 10 is generally illustrated as a tow motor vehicle having a plurality of wheels 18 for travel on the ground, such as a roadway. The motor vehicle 10 generally has a body 12 that may define a cabin interior and has a front end 14 and a rear end 16. In the example shown, the motor vehicle 10 is configured as a pickup truck; however, it should be appreciated that the motor vehicle 10 may be otherwise configured as a car, van, truck, sport utility vehicle (SUV) or other motor vehicle configured to tow a trailer.

The motor vehicle 10 is equipped with a vehicle trailer tow hitch 25 mounted or assembled to the rear end 16 of the motor vehicle 10. The vehicle trailer tow hitch 25 generally includes a tow bar extending from a bracket having a hitch connecting feature such as a tow ball. The bracket may be bolted or welded to the vehicle frame. The trailer 20 has a trailer tongue 24 configured to engage the tow ball on the vehicle trailer hitch 25 with a coupler 26 provided on the front end thereof. The trailer coupler 26 is configured to engage and latch onto the tow ball on the vehicle trailer hitch 25 to connect the trailer 20 to the motor vehicle 10 and allow the trailer 20 to articulate about the trailer coupler-to-hitch connection as the motor vehicle 10 maneuvers with left and right steering directions while traveling.

The trailer 20 is shown having a body 22 supported on a plurality of wheels 28. In addition, the trailer 20 may include various electrical powered accessories or devices including light devices 34. For example, the trailer 20 may include trailer brake lights, tail/running lights, turn/stop lights, and reverse lights, for example. Each of the light devices 34 may receive electric power supplied from the motor vehicle 10, such as a DC voltage from the vehicle battery, through an electrical connection to the trailer 20. The electrical connection is provided through an electrical cable 30 which connected to a plug-in connector 32 on the trailer 20 that plugs into and connects to the vehicle electrical connector system 40 shown as shown and described herein.

Figure 2:
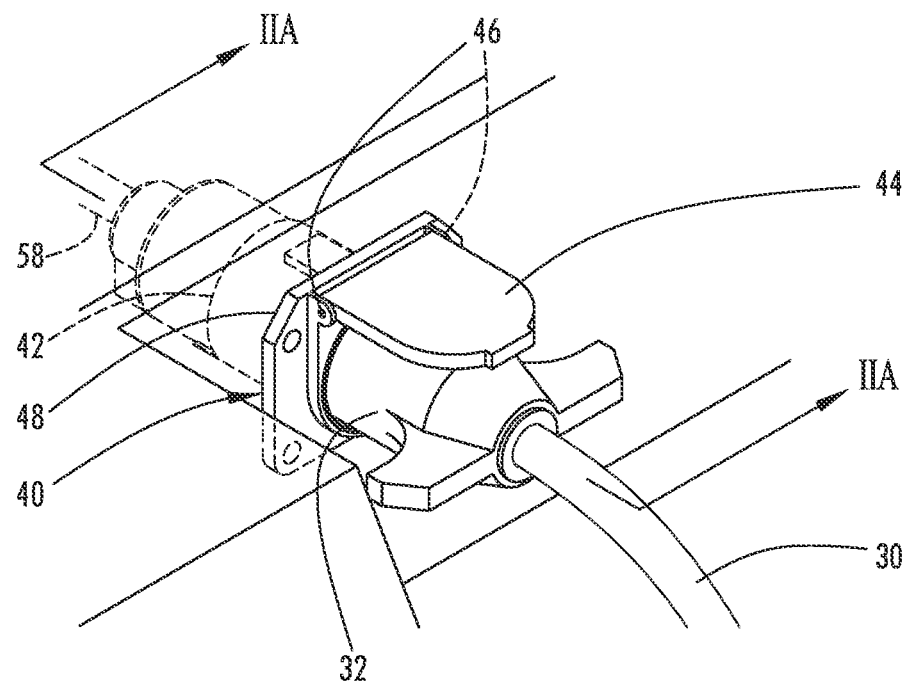
FIG. 2 is an enlarged view of section II of FIG. 1 illustrating the vehicle trailer electrical connector system connected to a trailer plug-in connector.
Figure 2A:
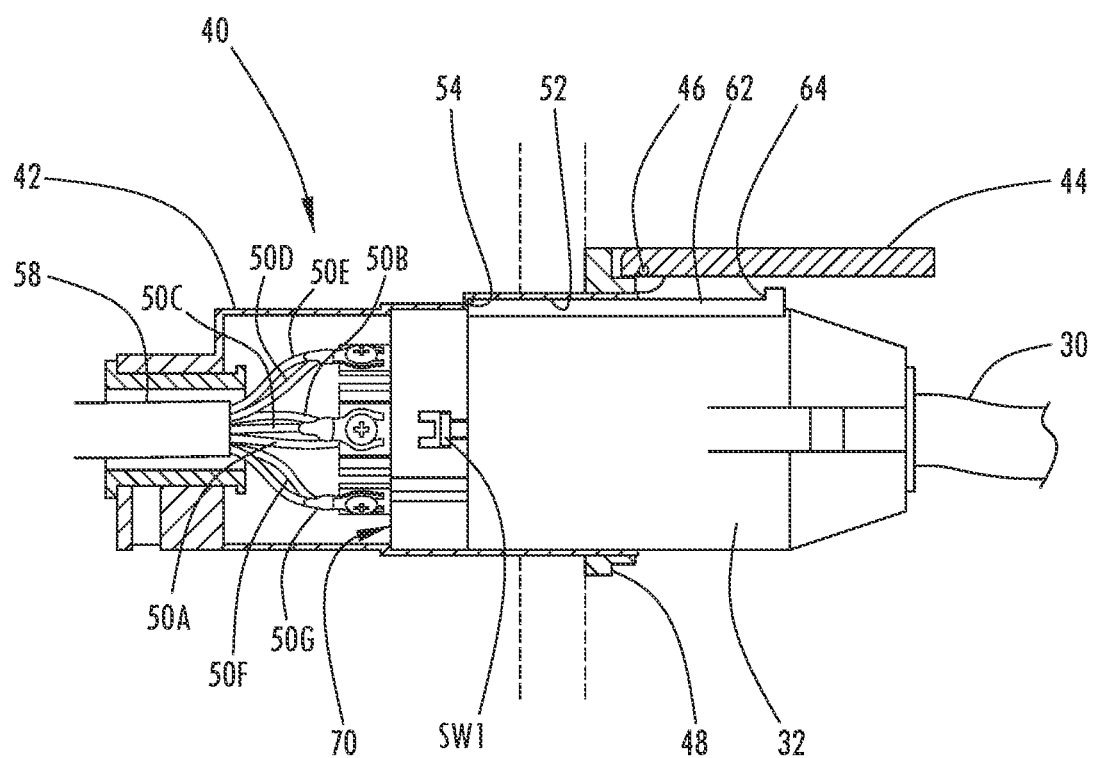
FIG. 2A is a cross-sectional view of the electrical connector arrangement taken through line IIA-IIA of FIG. 2.

The motor vehicle 10 is equipped with the trailer connection detection system 40 for detecting a state of the trailer 20 connected to the vehicle trailer tow hitch electrical connector system 40 via the electrical connector 32. The electrical connector system 40 is illustrated connected to the trailer plug-in connector 32 in FIGS. 2-4. The trailer plug-in connector 32 is shown plugged into and connected to a connector receptacle 42 of the electrical connector system 40 in FIGS. 2 and 2A. This may be achieved by pivotally opening a cover 44 which pivots about pivot pins 46 to an open position as shown in FIG. 2 to allow the trailer plug-in connector 32 to be inserted within the receptacle 42 of the electrical connector system 40. The electrical connector system 40 is supported by a housing having a face plate 48 extending from the rear end 16 of the motor vehicle 10. As such, the connector receptacle 42 is positioned near the tow hitch 25 or in a convenient location to receive the trailer electrical plug-in connector 32. When the trailer plug-in connector 32 is removed from the receptacle 42, the cover 44 may flip down via a bias spring to cover the receptacle opening.

Figure 3:
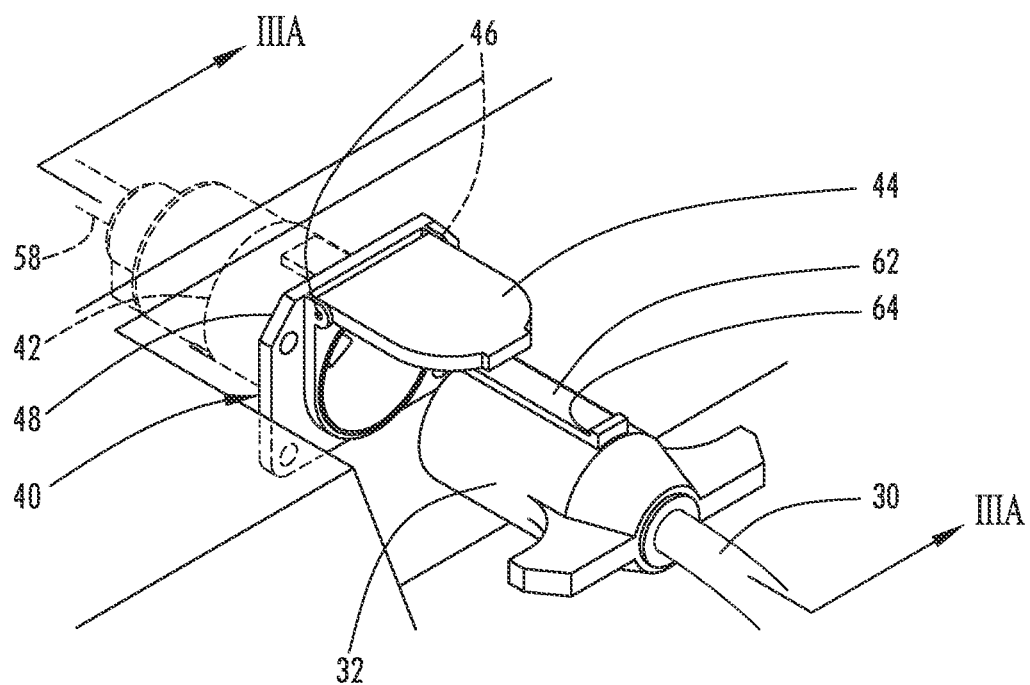
FIG. 3 is a schematic view of the electrical connector system with the trailer plug-in connector unplugged.
Figure 3A:
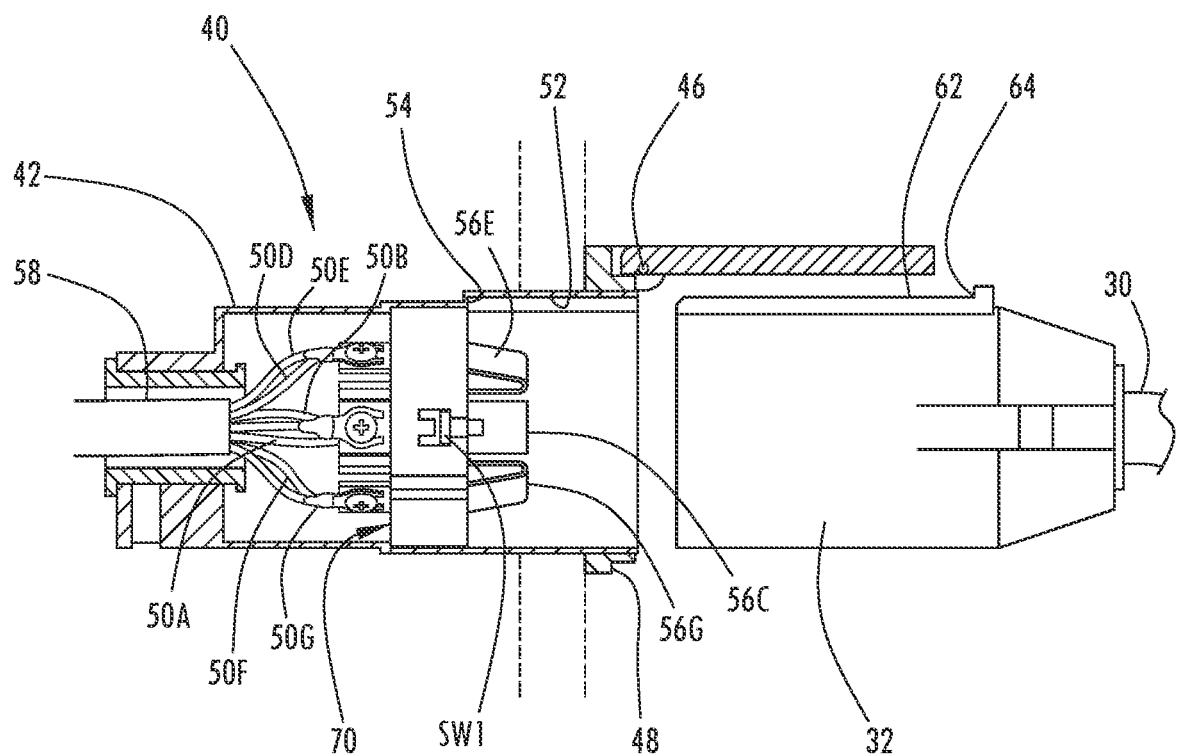
FIG. 3A is a cross-sectional view of the connector arrangement taken through line IIIA-IIIA of FIG. 3.
Figure 4:
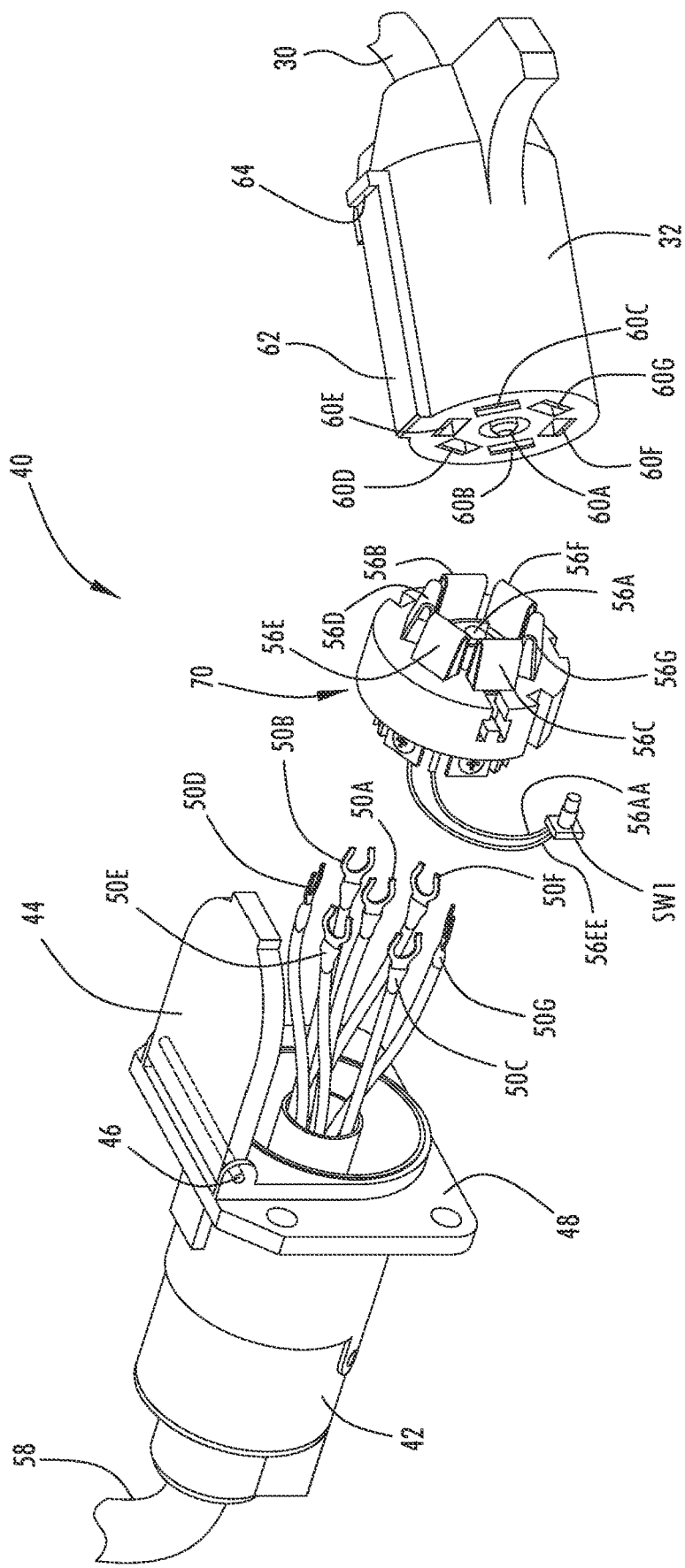
FIG. 4 is a perspective view of the trailer electrical connector disconnected from the trailer plug-in connector.

The electrical connector system 40 includes an alignment channel 52 as seen on the upper side in FIG. 3A for receiving an alignment member 62 on the trailer connector 32. The alignment member 62 is shown as a bar that matingly extends within the channel 52 until it abuts an end stop 54 within the receptacle 42. The alignment member 62 further includes an end stop 64 which is an upstanding wall. Once the plug-in connector 32 is fully inserted into the receptacle 42, the alignment member 62 aligns the electrical connectors in the proper position or orientation and ensures that the proper physical and electrical connection is made between the various connector components.

The electrical connector system 40 is configured to include a seven-way blade-type connector 70 shown having seven (7) electrical connectors 56A-56G, according to one example. Six of the electrical connectors 56A-56G are blade connectors which are arranged spaced radially at equal distance about the center and the other connector 56A is generally a rod-shaped pin and centrally located. Each of the electrical connectors 56A-56G are shown as male members having a shape and size adapted to matingly fit within seven female receptacles of the plug-in connector 32. Each of the electrical connectors 56A-56G, respectively, is connected to a wire such as wires 50A-50G which, in turn, extend within a cable 58. Each of the wires 50A-50G provides electrical signals to the electrical connectors 56A-56G.

The trailer plug-in connector 32 includes a plurality of receptacles 60A-60G shown in this example having seven different receptacles including one cylindrical receptacle 60A centrally in the middle and six electrical blade receiving receptacles 60B-60G arranged in a spaced radial pattern. Each of the receptacles 60A-60G are configured to align with and receive the electrical connectors 56A-56G, respectively, on the seven-way connector 70 to form electrical connections when the trailer plug-in connector 32 is fully inserted into the vehicle electrical connector receptacle 42. While a seven-way connector 70 is shown and described herein in one example, it should be appreciated that the electrical connector system 40 may have other numbers and arrangements of connectors such as a thirteen-way connector, for example.

The electrical connector system 40 further includes a normally closed switch SW1 shown disposed within the seven-way connector 70 and electrically connected to two of the connectors 56A and 56E such as via jumper wires 56AA and 56EE. The normally closed switch SW1 changes state between the normally closed state and an open state based on the state of the connection of the plug-in connector 32 to the receptacle 42. According to one embodiment, the normally closed switch SW1 is a mechanical switch that changes state based on physical movement of a mechanical part. The switch SW1 may include a mechanical moving element that is forcibly engaged by the plug-in connector 32 and moves when the plug-in connector 32 is plugged into the receptacle 42 to change the state of the normally closed state of the switch SW1 to an open state position which is an indication of a trailer connection. When the trailer plug-in connector 32 is disconnected from the receptacle 42, the switch SW1 returns to the normally closed state indicative of no trailer connected to the vehicle. According to another embodiment, the normally closed switch SW1 is a magnetic switch that changes state based on the arrangement of magnetic parts that may align to change state.

Figure 5:
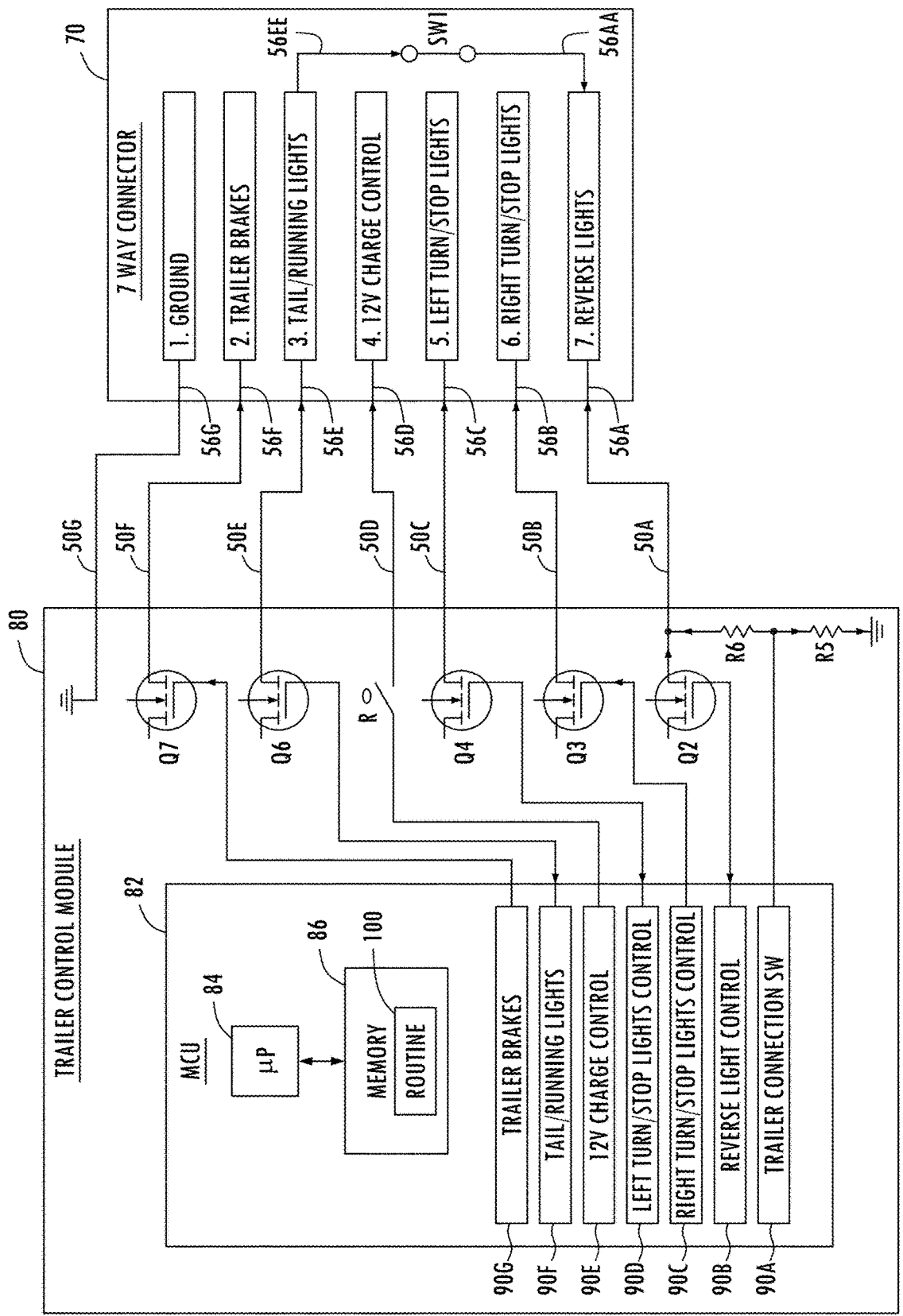
FIG. 5 is a block/circuit diagram of the vehicle trailer connector system.

Referring to FIG. 5, the controller and electrical circuitry associated with the trailer connector system are further illustrated. The motor vehicle may include a trailer control module 80 that may be a designated trailer control module or shared control module. The trailer control module 80 is shown including a controller 82, shown as a micro control unit (MCU) which may include a microprocessor 84 and memory 86. It should be appreciated that the controller 82 may include other analog and/or digital control circuitry. Stored within the memory 86 and executed by the microprocessor 84 are one or more routines 100 such as routine 100 for monitoring the trailer connection and determining when the trailer plug-in connector 32 is electrically connected to the trailer connector system 40 on the motor vehicle.

The trailer module 80 is configured to receive signals associated with controlling electrical components or features on the trailer. The electrical signals may include a trailer connection switch signal 90A, a reverse light control signal 90B, a right turn/stop lights control signal 90C, a left turn/stop lights control signal 90D, a 12-volt charge control signal 90E, a tail/running lights signal 90F and trailer brakes signals 90G, for example. The trailer module 80 also includes transistors Q2, Q3, Q4, Q6 and Q7, resistors R5 and R6 and a relay R which are shown coupled to the seven-way connector 70. One of the transistors Q6 is in series with electrical connector 56E and another of the transistors Q2 is in series with electrical connector 56A which are coupled to switch SW1. The seven-way connector 70 receives the various signals from the trailer module including a ground signal at connector 56G which is connected to wire 50G, trailer brakes signals at connector 56F which is connected to wire 50F, trail/running light signals at connector 56E which is connected to wire 50C, the 12-volt charge control signal at connector 56D which is connected to wire 50D, left turn/stop light signal at connector 56C which is connected to wire 50C, right turn/stop light signal at connector 56B which is connected to wire 50B, and reverse light signal at connector 56C which is connected to wire 50A. The normally closed switch SW1 is shown connected in parallel across connectors 56A and 56E via jumper lines 56AA and 56EE in a normally closed state which is indicative of no trailer electrical connection. The normally closed switch SW1 changes state when the plug-in connector 32 forcefully contacts the switch SW1 causing a closed circuit connection across the switch SW1. When the trailer plug-in connector 32 is plugged into the receptacle 42, the normally closed switch SW1 changes state to an open position which is detected by the controller 82 and hence an electrical connected state of a trailer to the motor vehicle is detected.

Figure 6:
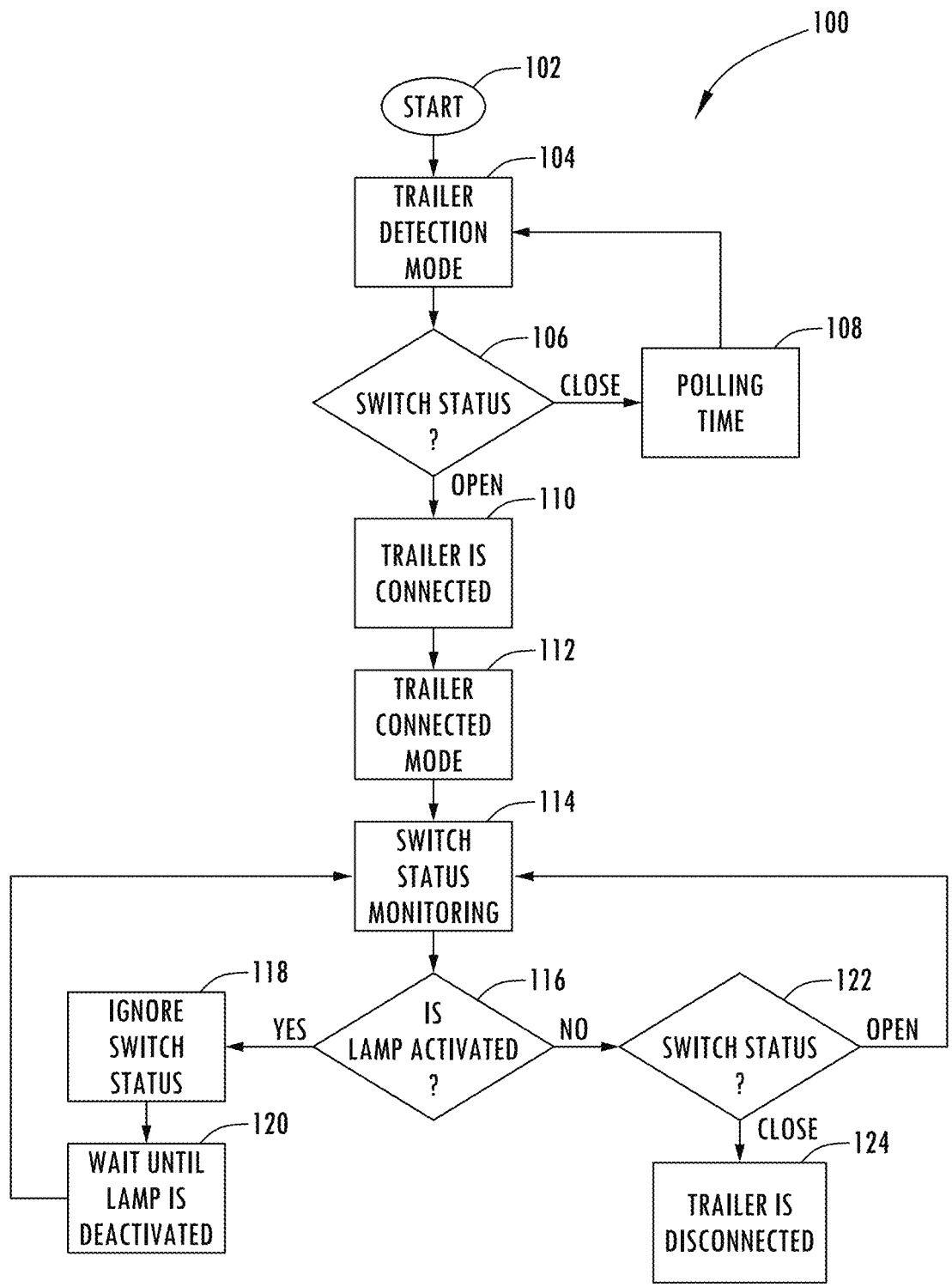
FIG. 6 is a flow diagram illustrating a routine for monitoring and detecting a trailer connected to the vehicle with the vehicle trailer electrical connector system.

Referring to FIG. 6, a routine 100 for monitoring and detecting a state of connection of a trailer to the motor vehicle is illustrated, according to one example. Routine 100 begins at step 102 and proceeds to step 104 to enter the trailer detection mode. Next, at decision step 106, routine 100 determines the switch status of the normally closed switch. If the normally closed switch is closed, routine 100 goes through a polling time at step 108, before returning to step 104. If the switch state of the normally closed switch is an open state, routine 100 proceeds to step 110 to determine if the trailer is connected to the motor vehicle, and then proceeds to step 112 to determine that the trailer is operating in the connected mode. Next, routine 100 proceeds to step 114 to monitor the switch status, and then to decision step 116 to determine if a lamp is activated. If a lamp is activated, routine 100 proceeds to step 118 to ignore the switch state and then proceeds to step 120 to wait until the lamp is deactivated before returning to step 114. If the lamp is not activated, routine 100 proceeds to decision step 122 to determine the normally closed switch status. If the switch status is open, routine 100 returns to step 114. If the switch status is in the closed state, routine 100 proceeds to step 124 to determine if the trailer is disconnected. Thereafter, the routine 100 ends.

Accordingly, the vehicle trailer detection system 40 advantageously monitors and detects the connection status of a plug-in connector 32 on a trailer 20 to a connector receptacle 42 on the motor vehicle 10 by employing a normally closed switch SW1 built into the electrical connector. This advantageously allows the electrical detection system 40 to inform the driver of the connection and to control various vehicle systems based on the status of the trailer connection. For example, a trailer backup assist system or other trailering assist system may be activated based on the determined connection of a trailer 20 to the motor vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A trailer electrical connector system for a motor vehicle, the electrical connector system comprising:
    a housing configured to be connected to the motor vehicle;
    a plurality of electrical connectors each configured to connect to a plug-in trailer connector to provide electrical power to a trailer;
    a normally closed switch electrically coupled to a pair of the electrical connectors, wherein the normally closed switch is in a closed state when the plug-in trailer connector is not connected to the plurality of electrical connectors and moves to an open state when the plug-in electrical connector is connected to the electrical connectors, and wherein the pair of electrical connectors comprises a first electrical connector for providing a first trailer control signal and a second electrical connector providing a second trailer control signal; and
    a controller sensing an electrical signal across the pair of electrical connectors through the normally closed switch and detecting a state of the electrical connection of the trailer to the vehicle based on the detected state.

2. The trailer electrical connector system of claim 1, wherein the normally closed switch comprises a mechanical switch.

3. The trailer electrical connector system of claim 1, wherein the normally closed switch comprises a magnetic switch.

4. The trailer electrical connector system of claim 1, wherein the first trailer control signal comprises a first trailer light signal and the second trailer control signal comprises a second trailer light signal.

5. The trailer electrical connector system of claim 4, wherein the first trailer light signal comprises a vehicle trailer running light signal and the second trailer light signal comprises a trailer reverse light signal.

6. The trailer electrical connector system of claim 1, wherein at least some of the electrical connectors comprises blades.

7. The trailer electrical connector system of claim 6, wherein the plurality of electrical connectors comprises seven electrical connectors.

8. The trailer electrical connector system of claim 1 further comprising a first transistor in line with a first electrical connector and a second transistor in series with a second electrical connector.

9. The trailer electrical system of claim 1, wherein the controller further controls a vehicle trailering system based on the detected state.

10. A vehicle comprising:
    a trailer tow hitch; and
    a trailer electrical connector system comprising:
        a housing connected to the vehicle;
        a plurality of electrical connectors each configured to connect to a plug-in trailer connector to provide electrical power to a trailer;
        a normally closed switch electrically coupled to a pair of the electrical connectors, wherein the normally closed switch is in a closed state when the plug-in trailer connector is not connected to the plurality of electrical connectors and moves to an open state when the plug-in trailer connector is connected to the electrical connectors, and wherein the pair of electrical connectors comprises a first electrical connector for providing a first trailer control signal and a second electrical connector providing a second trailer control signal; and a controller sensing an electrical signal across the pair of electrical connectors through the normally closed switch and detecting a state of the electrical connection of the trailer to the vehicle based on the detected state.

11. The vehicle of claim 10, wherein the normally closed switch comprises a mechanical switch.

12. The vehicle of claim 10, wherein the normally closed switch comprises a magnetic switch.

13. The vehicle of claim 10, wherein the first trailer control signal comprises a first trailer light signal and the second trailer control signal comprises a second trailer light signal.

14. The vehicle of claim 13, wherein the first trailer light signal comprises a vehicle trailer running light signal and the second trailer light signal comprises a trailer reverse light signal.

15. The vehicle of claim 10, wherein the plurality of electrical connectors comprises seven electrical connectors.

16. The vehicle of claim 10, wherein at least some of the electrical connectors comprises blades.

17. The vehicle of claim 10 further comprising a first transistor in series with a first electrical connector and a second transistor in series with a second electrical connector.

18. The vehicle of claim 10, wherein the controller further controls a vehicle trailering system based on the detected state.

* * * * *